Figure 1A:
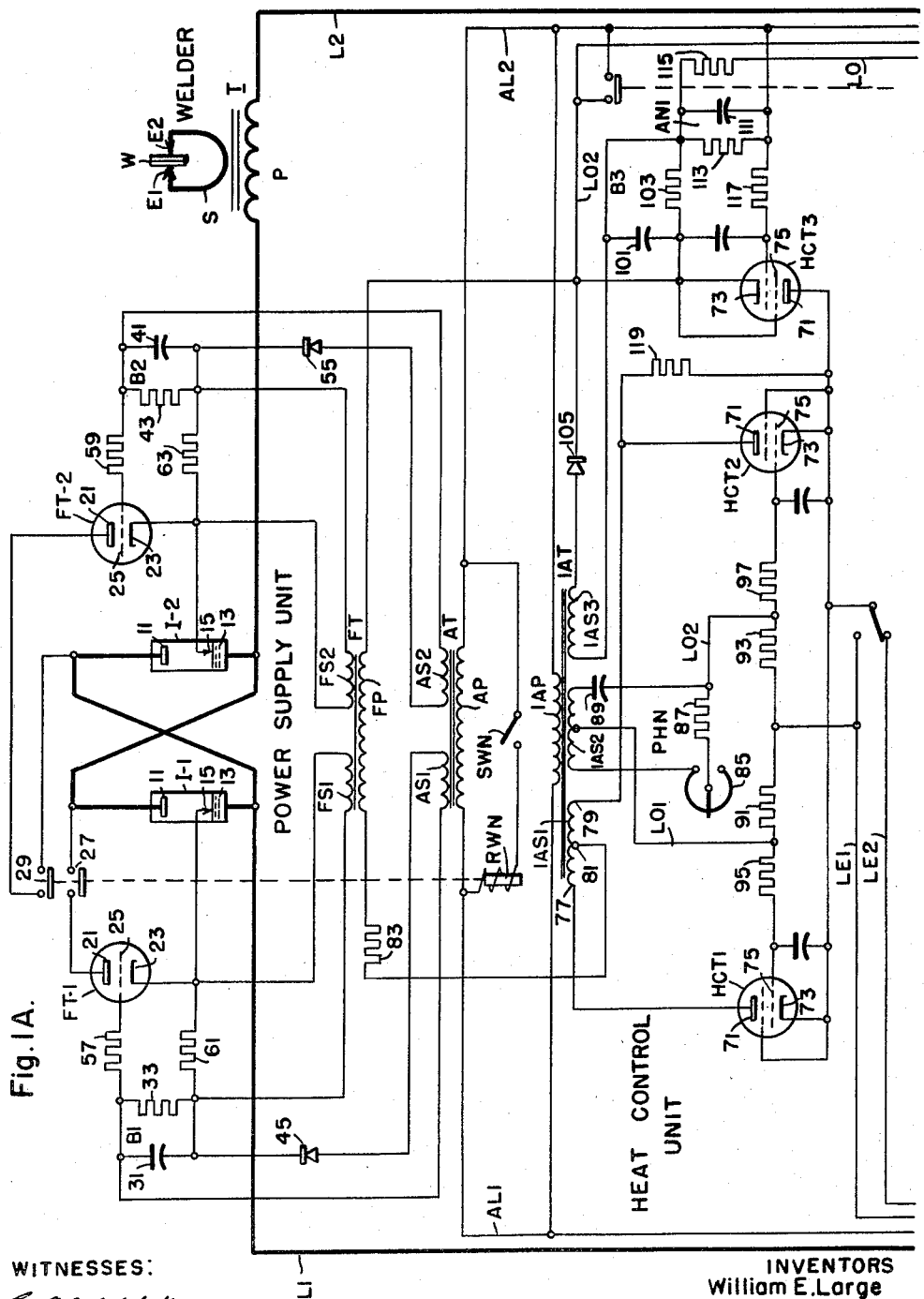

May 17, 1960  W. E. LARGE ET AL  2,937,338
ELECTRIC DISCHARGE APPARATUS
Filed Aug. 26, 1954  3 Sheets-Sheet 1

WITNESSES:
E. A. McCloskey
Leon M. Garman

INVENTORS
William E. Large
and Donald R. Scholtes.
BY
Hymen Diamond
ATTORNEY

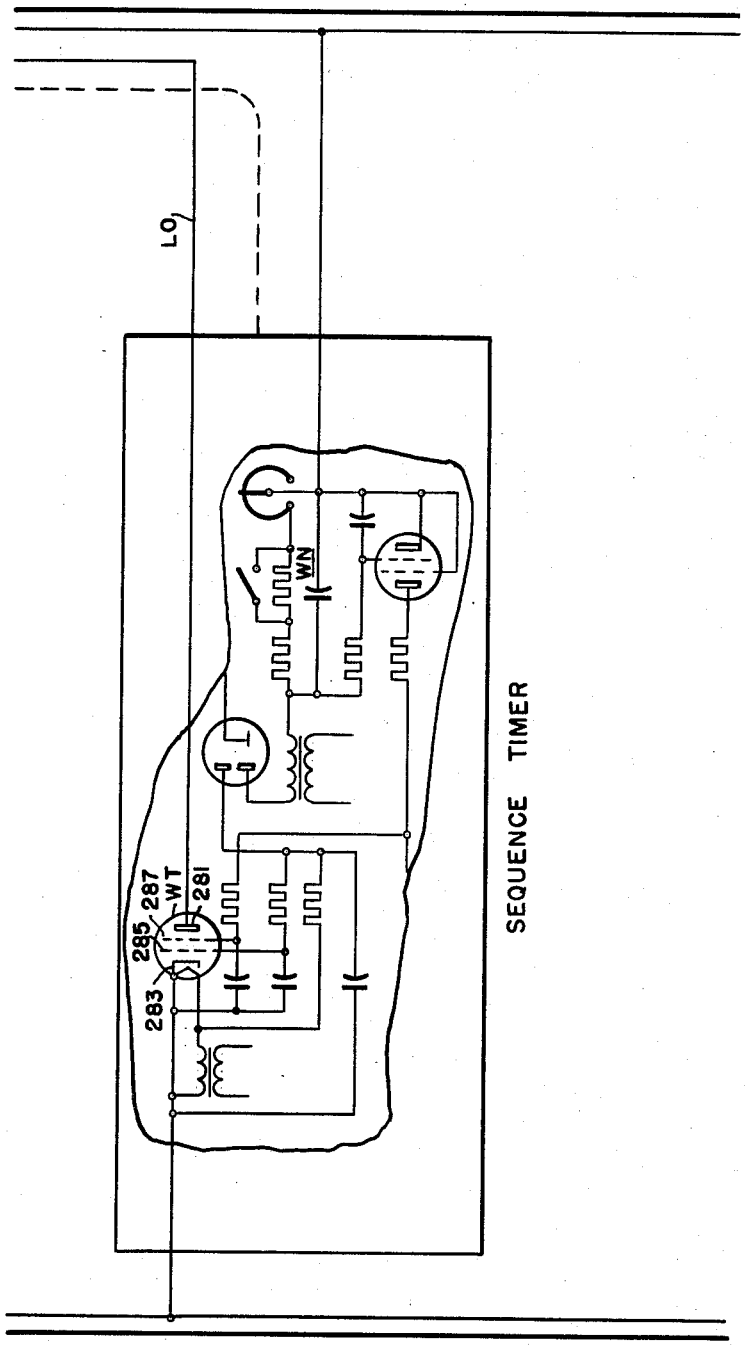
Fig. IC.

United States Patent Office 2,937,338
Patented May 17, 1960

2,937,338
ELECTRIC DISCHARGE APPARATUS

William E. Large, Lancaster, and Donald R. Scholtes, Depew, N.Y., assignors to Westinghouse Electric Corporation, East Pittsburgh, Pa., a corporation of Pennsylvania Application August 26, 1954, Serial No. 452,249

11 Claims. (Cl. 328—75)

Our invention relates to electric discharge apparatus, and has particular relation to control apparatus for resistance welding.

In resistance welding the welding current is supplied through electric discharge devices or valves which are referred to as main discharge devices. It has become customary in this art, by controlling the main discharge devices, not only to control the duration of the welding current, but also the magnitude of the welding current. The control of the magnitude is customarily referred to as heat control, and is usually effected by setting the instants in the periods of the supply when the main discharge devices are rendered conducting during the welding interval. It has further been found that in many situations, particularly in the welding of aluminum and its alloys and like materials, the quality of the weld is materially affected by the wave form of the welding current and it has become customary to vary the heat control during a weld so as to arrive at a desired wave form. The variation of the heat control to produce a desired wave form is customarily called slope control. In welding apparatus including slope control, each welding current pulse may have three components (or any two of these components); a preheat or up-slope component during which the welding current rises from a predetermined initial value to the welding value, a weld component during which the current is maintained at the welding value, and a post heat or down-slope component during which the current magnitude falls from the welding value to a final value.

In welding apparatus in accordance with the teachings of the prior art of which I am aware, it is customary to control the firing of the main discharge devices for heat and slope control purposes, by impressing in the control circuit of controlling devices which are connected in a circuit usually called the heat control unit, a composite potential consisting of a potential shifted in phase relative to the potential which supplies the main discharge, and a variable, direct-current potential which determines the instants in the half periods of the supply when the phase shifted potential becomes effective. The variable, direct-current potential is derived from the slope control unit, and is in this unit varied to achieve the desired wave form.

In welding with apparatus of the prior art type just discussed, we have encountered difficulty in maintaining the wave form as precisely as necessary for producing high quality welds. We have in fact found that the magnitudes of the welding current during the preheat, post heat and weld intervals varies materially from the preset desired pattern and that this variation deleteriously affects the welds.

It is, accordingly, an object of our invention to provide welding apparatus including slope control facilities with which it shall be possible to produce and maintain within narrow limits a desired wave form for the welding pulse.

Another object of our invention is to provide control apparatus for resistance welding including heat control and slope control facilities in the use of which the preheat, post heat and weld components shall be maintained precisely.

Our invention in one of its aspects arises from the discovery that the cause of the undesired variations in the wave form of the welding current pulse in prior art apparatus resides in the manner in which the slope control unit cooperates with the heat control units. In accordance with the teachings of the prior art, the heat control unit is set so to fire the main discharge devices as to produce the desired heat, and the slope control unit is set to shift the firing of the main discharge devices to later instants in the periods of the supply than the setting for the desired heat. The firing instant is dependent with substantial linearity on the impressed voltage, and is thus dependent not only on the slope control voltage impressed, but also on the heat control setting in any situation. It follows that in prior art apparatus the initial and final current components of the welding pulse, the former important because it affects the preheating of the work and the latter because it affects the annealing, are dependent on the initial heat control setting.

Another aspect of our invention arises from the realization that the undesired changes in the welding current wave shape encountered with prior art apparatus is caused by the variations in the characteristics of the electrical components, such as the tubes, resistors, capacitors, of the slope control unit, and also by the variations of the voltage which supplies these components. We have discovered that because the direct-current potential which sets the wave form is derived, in accordance with the teachings of the prior art, from a network having a high terminal impedance, these variations in component characteristics and line voltage have a marked effect on the wave form of the overall welding pulse. But what is equally important, we have found that the high output impedance of the slope control unit causes it to interact in an undesired manner with the heat control unit. This difficulty arises from the fact, as we have found, that the control devices of the heat control unit which receives the slope control signal have a low input impedance and the control electrodes of these control devices are, during operation, raised to a positive potential relative to the cathodes so that they draw grid current. We have discovered that improper matching of the slope control unit output circuit and the heat control unit input circuit and the drop produced in the output circuit by the grid current materially affect the wave form of the welding pulse.

In accordance with our invention, the heat control unit is set not at the desired setting, but at an intermediate firing angle, for example, to fire at one-quarter of a period after the zero instant, and the slope control unit is connected to shift the firing angle backward and forward about this setting, the actual heat-control setting of the weld component of the pulse being effected in the slope control unit. Thus, the variations produced by different heat control settings are eliminated. In addition the shift in the output voltage of the slope control unit required to produce a desired wave form is smaller than for prior art apparatus and the effects of changes in the supply voltage is correspondingly reduced.

In addition in accordance with our invention, we provide welding apparatus and control apparatus for welding apparatus, including slope control facilitates in which the slope control signal, while being of the variable, direct-current type as in apparatus in accordance with the teachings of the prior art, is derived from a network having a low terminal impedance. The sensitivity of this network to changes in the characteristics of the components is small and the signal delivered by the network is not materially affected by the input circuit of the heat control unit. The low output impedance of the network matches the low input impedance of the heat control unit and in addition because the output impedance of the network is low, the potential drop produced across the output impedance by the grid current in the input circuit is low and does not change the input signal from the slope control unit appreciably and thus does not affect the wave form.

In accordance with the specific aspects of our invention, we provide a system in which the slope control signal is derived from a novel cathode follower circuit, including a pair of cathode follower units so connected that the slope control signal is derived between their output terminals. The cathode follower units each has high degenerative feedback and thus a low output impedance. The effects of line variation or of variations of the characteristic of the electrical components is minimized. The cathode followers are controlled so as to produce the desired preheat, post heat and weld components of the welding current pulse. Our invention in its specific aspects involves not only novel heat control apparatus, but also a novel cathode follower circuit combination and a control circuit which cooperates in a novel manner with the heat control circuit and with a cathode follower circuit combination and it is an ancillary object of our invention to provide such novel circuits.

Figure 1B:
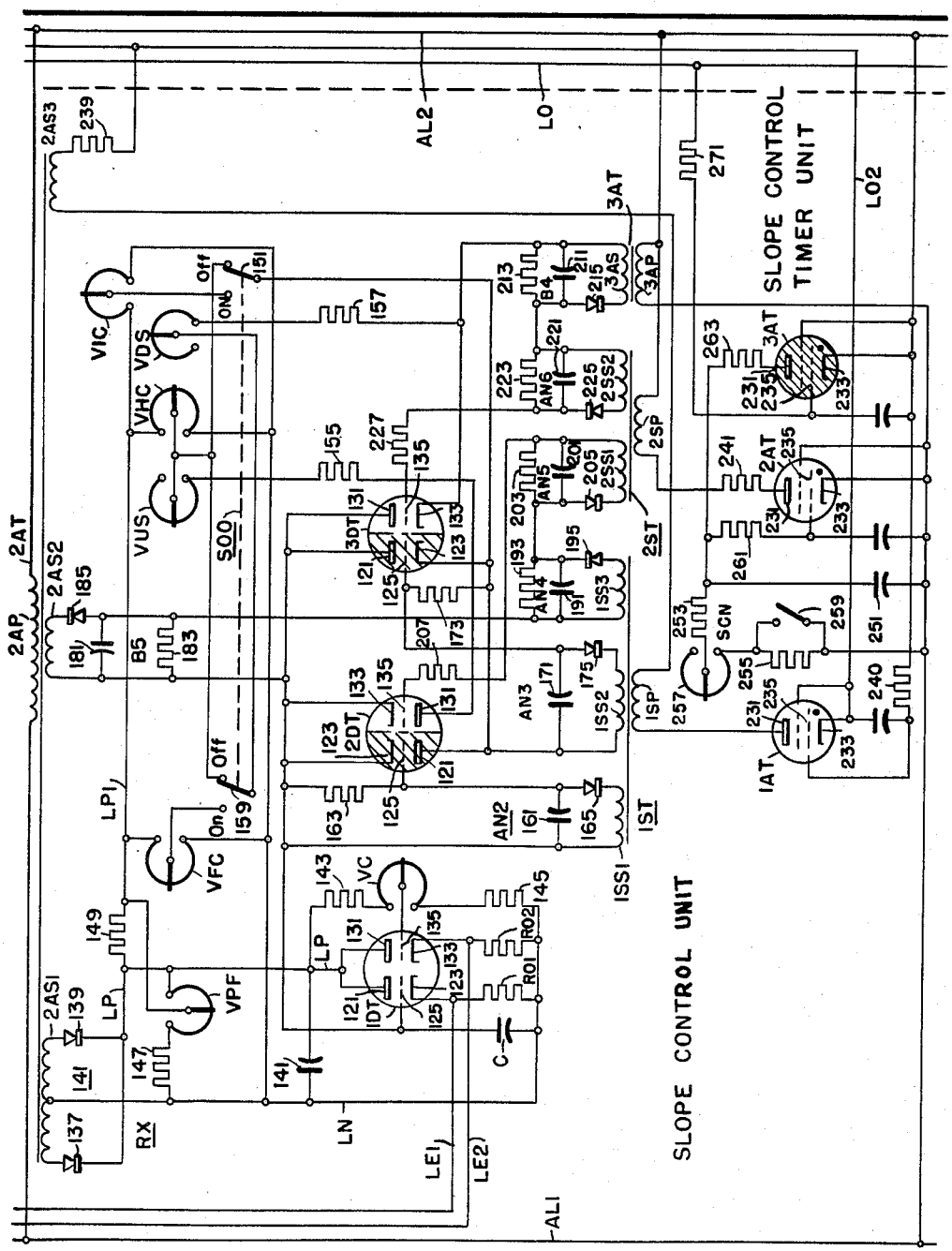

The novel features that we consider characteristic of our invention are set forth generally above. The invention itself, however, both as to its organization and its method of operation, together with additional objects and advantages thereof, will be understood from the following description of a specific embodiment when read in connection with the accompanying drawings, in which:

Fig. 1A, Fig. 1B and Fig. 1C together constitute a circuit diagram of a preferred embodiment of our invention.

Description

The apparatus shown in the drawing includes a Welder, a Power Supply Unit, a Heat Control Unit, a Slope Control Unit, a Slope Control Timer Unit, and a Sequence Timer. This apparatus is supplied with power from a pair of conductors or buses L1, L2, which may be connected to a commercial supply through the usual switches or circuit interrupters (not shown). Since the Heat Control Unit, the Slope Control Unit, the Slope Control Timer Unit and the Sequence Timer require a different potential than the Power Supply Unit and the Welder, the latter are supplied from auxiliary buses or conductors AL1 and AL2, which derive their power from the conductors L1 and L2 through a suitable transformer (not shown).

The Welder includes a welding transformer T having a primary P and a secondary S. Across the secondary S electrodes E1 and E2 are connected. These electrodes are adapted to engage the work under pressure. The mechanism for actuating the electrodes and applying pressure to the work W does not concern the present invention and is not disclosed.

The Power Supply Unit includes a pair of ignitrons I-1 and I-2. Each ignitron has an anode 11, a cathode 13 and an igniter 15. The anodes 11 and cathodes 13 are connected in antiparallel or inverse parallel between the conductors L1 and L2 and the primary P. With each ignitron a firing thyratron FT1 and FT2, respectively is associated. Each firing thyratron has an anode 21, a cathode 23 and a control electrode 25. Each of the anodes 21 is adapted to be connected to the anode 11 of an associated ignitron I-1 or I-2 through normally open contacts 27 and 29 of a weld-no-weld relay RWN. Each cathode 23 of a firing thyratron FT1 or FT2 is connected to the igniter 15 of the associated ignitron (I-1 or I-2) directly.

Between the control electrodes 25 and the cathode 23 of each firing thyratron FT1 and FT2 a composite potential is impressed. This potential consists of a blocking bias and a potential for counteracting the blocking bias. The blocking bias is derived from networks B1 and B2, each consisting of a capacitor 31 and 41 shunted by a resistor 33 and 43. Each network B1 and B2 is supplied from a secondary AS1 and AS2 of a transformer AT through rectifiers 45 and 55. The primary AP of the transformer AT derives its power from the conductors AL1 and AL2. The counteracting potential is derived from the secondaries FS1 and FS2 of a firing transformer FT, the primary FP of which is supplied from the Heat Control Unit. The biasing networks B1 and B2 are each connected between the control electrode and the cathode of an associated firing thyratron FT1 and FT2 through grid resistors 57 and 59 and through resistors 61 and 63 across which the counteracting potential from secondaries FS1 and FS2 is impressed.

The Heat Control Unit includes a plurality of thyratrons HCT1, HCT2 and HCT3. The thyratrons are preferably alike each having an anode 71, a cathode 73 and a control electrode 75. The Heat Control Unit is supplied with power from a transformer 1AT having a primary 1AP energized from the buses AL1 anad AL2 and a plurality of secondaries 1AS1, 1AS2 and 1AS3. One of the secondaries 1AS1 has a pair of terminal taps 77 and 79 and an intermediate tap 81. One terminal tap 77 is connected to the anode 71 of the thyratron HCT1; the other 79 to the anode 71 of the thyratron HCT2. The cathodes of these thyratrons 73 are connected together and their common connection is connected to the anode 71 of the thyratron HCT3. The cathode 73 of the thyratron HCT3 is connected to the intermediate tap 81 through the primary FP and a current limiting resistor 83. It is seen that thyratrons HCT1 and HCT2 are each connected in series with thyratron HCT3, the primary FP and the current limiting resistor 83.

The Heat Control Unit also includes a phase shift network PHN. This network is supplied from another secondary 1AS2 of the transformer 1AT and includes a variable resistor 85, a fixed resistor 87 and a capacitor 89. The secondary 1AS2 has a pair of terminal taps and an intermediate tap, and the resistors 85 and 87 and the capacitor 89 are connected in series across the terminal taps. The output conductors LO1 and LO2 of the network PHN are connected to the junction of the capacitor 89 and the fixed resistor 87 and to the intermediate tap. Across the output terminals LO1 and LO2 a pair of resistors 91 and 93 of equal magnitude are connected. The output terminal LO1 is also connected to the control electrode 75 of the thyratron HCT1 through a grid resistor 95, and the output terminal LO2 is connected to the control electrode 75 of the thyratron HCT2 through a second grid resistor 97. At the junction of the resistors across the conductors LO1 and LO2, one of the output conductors LE1 from the Slope Control Unit is connected. The other output conductor LE2 from the Slope Control Unit is connected to the common connection of the cathodes of thyratrons HCT1 and HCT2.

The phase shift network provides a potential between the conductors LO1 and LO2 which is displaced in phase by an angle dependent on the setting of the variable resistor 85 in network PHN, with reference to the potential impressed between the anodes 71 and the cathodes 73 of the thyratrons HCT1 and HCT2. This phase shifted potential is impressed between the control electrodes 75 and the cathode 73 of the thyratrons, and on this phase shifted potential, the potential derived from the conductors LE1 and LE2 is superimposed. The thyratrons HCT1 and HCT2 are fired at instants in the periods of the potential derived from the conductors AL1 and AL2 which depends on the composite potential derived from the conductors LO1 and LO2 and LE1 and LE2. The variable resistor 85 is set preferably by a factory adjustment or by a back-panel screw adjustment at a predetermined angle which is maintained during the life of the equipment. Preferably, this angle is of the order of 90° or one-quarter period of the supply. In the absence of any potential impressed between the conductors LE1 and LE2 then, the thyratrons HCT1 and HCT2 if they are of the usual type can fire at a phase angle displaced by approximately one-quarter period from the instants of zero potential. But the thyratrons HCT1 and HCT2 are incapable of conducting unless thyratron HCT3 is also conducting, since the latter is connected in series with each of the thyratrons HCT1 and HCT2.

The thyratron HCT3 is supplied with a composite control potential consisting of a blocking bias and a counteracting potential. The blocking bias is derived from the network B3 consisting of a capacitor 101 shunted by a resistor 103. This network is supplied from one of the secondaries 1AS3 through a rectifier 105. The counteracting potential is derived from a network AN1 consisting of a capacitor 111 shunted by a resistor 113. This network may be supplied from the output conductor LO of the Sequence Timer through a resistor 115. The networks B3 and AN1 are connected between the control electrode and the cathode of thyratron HCT3 through a grid resistor 117.

In the operation of the Heat Control Unit, the thyratron HCT3 times or counts the number of periods during which the Heat Control Unit is operating, and the thyratrons HCT1 and HCT2 each start to conduct at the instants in these half periods at which the Heat Control Unit supplies firing potential to the Power Supply Unit. Thus, thyratron HCT3 conducts before thyratrons HCT1 or HCT2 conduct. A resistor 119 is connected across thyratron HCT2. This resistor 119 balances the anode voltages impressed on thyratrons HCT1 and HCT2.

The Slope Control Unit includes three pairs of electric discharge paths, which specifically may be included in three double triodes 1DT, 2DT and 3DT. The double triodes are preferably of the same type, each having a pair of anodes 121 and 131, a pair of cathodes 123 and 133 and a pair of control electrodes 125 and 135. The Slope Control Unit is supplied with power from a transformer 2AT having a primary 2AP supplied from the conductors AL1 and AL2 and a plurality of secondaries 2AS1, 2AS2 and 2AS3. Anode potential for the double triodes 1DT, 2DT and 3DT is supplied from a full wave rectifier network RX which derives its power from the secondary 2AS1. This rectifier includes a pair of rectifiers 137 and 139 connected in the usual full wave circuit 141. The rectifier has two output conductors, a positive conductor LP and a negative conductor LN.

The sections 121—123 and 131—133 of the double triode 1DT are connected in a pair of cathode-follower circuits. For this purpose the anodes 121 and 131 of the double triode 1DT are connected together to the positive conductor LP, and each of the cathodes 123 and 133 is connected through a separate output resistor RO1 and RO2 to the negative conductor LN. The output conductors LE1 and LE2 of the Slope Control Unit are connected directly to the cathodes 123 and 133 of the double triode 1DT. Between the control electrode and the negative conductor LN of one section of the double triode 1DT a capacitor C is connected. This capacitor is charged and discharged to determine the wave form of the welding current. Between the anode and the cathode of the other section of the double triode 1DT a pair of resistors 143 and 145 are connected in series with a voltage divider VC. The adjustable tap of the voltage divider VC is connected to the control electrode 135 of the other section of the double triode 1DT. Between the positive conductor LP and the negative conductor LN a pair of resistors 147 and 149 are connected in series with a variable resistor VPF, the variable tap of the latter resistor VPF being connected through one of the resistors 149 to the positive conductor LP. The setting of the variable resistor VPF determines the potential drop across resistor 149 and thus the potential of the conductor LP1 which supplies the double triodes 2DT and 3DT.

The charge and discharge of the capacitor C is determined by the conduction of the sections 121—123 and 131—133 of the other double triodes 2DT and 3DT. For this purpose, the anode 121 and cathode 123 of one section of the double triode 2DT is connected in a circuit extending from the positive conductor LP1 through a variable resistor VIC, a contact 151 of the on-off switch SOO when in the on position, the anode and cathode of the section of double triode 2DT, the capacitor C to the conductor LN. The conduction of the section of the double triode 2DT thus tends to charge the capacitor C with its plate connected to the control electrode 125 positive.

The anode 121 and cathode 123 of a corresponding section of the double triode 3DT are connected in anti-parallel to the section just mentioned of the double triode 2DT. This section of the double triode 3DT can conduct only if the capacitor C is charged to a potential exceeding that which is derived through the variable resistor VIC, and thus the potential on capacitor C is limited to that derivable from the variable resistor VIC.

The capacitor C may also be charged to the same polarity as it is charged through the above-mentioned section of double triode 2DT through a second section 131—133 of the same double triode. This charging circuit extends from the conductor LP1, through the variable resistor VHC, a variable resistor VUS, a resistor 155, the anode 131 and cathode 133 of the other section of the double triode 2DT, the capacitor C to the conductor LN. The resistor VUS has an impedance which is high compared to the resistor VHC.

The capacitor C may be discharged through the remaining section 131—133 of the double triode 3DT. This discharge circuit extends from the plate of the capacitor C, which is connected to the control electrode 125 of the section 121—123 of double triode 1DT, through the anode 131 and cathode 133 of the double triode 3DT, a fixed resistor 157, a variable resistor VDS, the contact 159 of the off-on switch SOO when it is in the on position, variable resistor VFC, conductor LN to the other plate of capacitor C. The resistance of resistor VDS is high compared to the resistance of VFC.

The first section 121—123 of the double triode 2DT is supplied with control potential through a network AN2 consisting of a capacitor 161 shunted by a resistor 163. This network is energized through a rectifier 165 from a secondary 1SS1 of a transformer 1ST, which derives its power from the Slope Control Timer Unit and is connected between the control electrode 125 and the cathode 123 of the section.

The corresponding section 121—123 of the double triode 3DT is supplied with control potential from a network AN3 consisting of a capacitor 171 shunted by a resistor 173. This network is supplied through a rectifier 175 from another secondary 1SS2 of the transformer 1ST, and is connected between the control electrode 125 and the cathode 123 of the section of double triode 3DT. The remaining section 131—133 of the double triode 2DT is supplied with a composite control potential consisting of a blocking bias, a counteracting blocking potential, and a second potential counteracting the counteracting potential. The blocking bias is derived from a biasing network B5 consisting of a capacitor 181 and a resistor 183 supplied from a secondary 2AS2 of the transformer 2AT through a rectifier 185. The counteracting potential is derived from a network AN4 consisting of a capacitor 191 shunted by a resistor 193. This network is supplied with potential through a third secondary 1SS3 of the transformer 1ST through a rectifier 195. The counter-counteracting potential is derived from a network AN5 consisting of a capacitor 201 shunted by a resistor 203. This network AN5 is supplied with potential through a rectifier 205 from a secondary 2SS1 of a transformer 2ST which is energized from the Slope Control Timer Unit. The networks B5, AN5, AN4, are connected between the cathode and the control electrode of the section of the double triode 2DT through a grid resistor 207.

The remaining section of the double triode 3DT is also controlled from a composite potential consisting of a blocking bias and a counteracting potential. The blocking bias is derived from a network B4 consisting of a capacitor 211 shunted by a resistor 213. This network B4 is supplied from a secondary 3AS of a transformer 3AT through a rectifier 215. The primary 3AP of the transformer 3AT is supplied from the conductors AL1 and AL2. The counteracting potential is derived from a network AN6 consisting of a capacitor 221 shunted by a resistor 223. This network is supplied with potential from a secondary 2SS2 of the transformer 2ST through a rectifier 225. The networks B4 and AN6 are connected between the cathode 133 and the control electrode 135 of the double triode 3DT through a grid resistor 227.

The Slope Control Timer Unit includes three thyratrons 1AT, 2AT and 3AT. These thyratrons are preferably alike, each having an anode 231, a cathode 233 and a control electrode 235.

The anode circuit of thyratron 1AT is supplied from secondary 2AS3 of transformer 2AT. This anode circuit extends from one terminal of the secondary through the primary 1SP, the anode 231 and the cathode 233 of thyratron 1AT, through a conductor LO2 and a resistor 239 to the other terminal of the secondary 2AS3. Thyratron 1AT is supplied with control potential in common with the thyratron HCT3. The control circuit for thyratron 1AT extends from the conductor AL2 through a grid resistor 240, the control electrode 235 and cathode 233 of thyratron 1AT, a conductor LO2, the network B3, the network AN1, to the conductor AL2. The network B3 then supplies blocking potential and the network AN1 counteracting potential to the thyratron 1AT.

The anode-cathode circuit of thyratron 2AT is supplied from the conductors AL1 and AL2. This circuit extends from conductor AL2 through primary 2SP, an anode resistor 241, the anode 231 and cathode 233 of thyratron 2AT to the conductor AL1. The thyratron 2AT is controlled from a time-constant network SCN including a capacitor 251 connected in parallel with a pair of fixed resistors 253, 255 and a variable resistor 257. One of the fixed resistors 255 may be shunted out by the switch 259 to shorten the time of discharge of the capacitor 251. The network SCN is connected between the control electrode and the cathode of thyratron 2AT through a grid resistor 261.

The anode 231 and cathode 233 of thyratron 3AT are connected in a circuit including conductor AL1, network SCN, an anode resistor 263, the anode 231 and cathode 233 of thyratron 3AT to conductor AL2. Thyratron 3AT is supplied with control potential from the Sequence Timer. Its control electrode 235 is connected to the conductor LO through a grid resistor 271 and its cathode 233 is connected to the conductor AL2. Since conductor LO is connected to the conductor AL2 through the resistor 115 and the network AN1, the control electrode of the thyratron 3AT is at cathode potential so long as the network AN1 is uncharged, and at this time, thyratron 3AT may then conduct.

The Sequence Timer may be of any of the usual types. For example, this Sequence Timer may be of the type disclosed in an application Serial No. 272,818, filed February 21, 1952, to Clarence B. Stadum, Hubert W. Van Ness and Edward C. Hartwig, and assigned to Westinghouse Electric Corporation. Such a Sequence Timer and others like it include a weld thyratron WT which is rendered conducting during a weld interval which starts after the welding electrodes have been properly engaged with the work and the pressure has been applied, and ends after a welding pulse of the desired duration has been transmitted to the work W being welded. The weld thyratron WT includes an anode 281, a cathode 283, and control electrodes 285 and 287 for controlling its conduction as just discussed. The anode 281 is connected to the conductor LO and through the resistor 115 in series with it and the network AN1 to the conductor AL2. The cathode is connected to the conductor AL1. When the thyratron WT is conducting, current thus flows through the conductor LO to charge the network AN1 in such a sense as to counteract the bias impressed by the network B3.

*Standby*

During the standby condition of the apparatus, the main circuit interrupters (not shown) are closed and power is supplied to the conductors L1 and L2 and AL1 and AL2. The weld-no-weld switch SWN is closed and the relay RWN is actuated so that the anodes 21 of the firing thyratrons FT1 and FT2 are connected to the anodes 11 of the associated ignitrons I-1 and I-2. The heaters of the thyratrons FT1, FT2, HCT1, HCT2, HCT3, 1AT, 2AT, 3AT, and the double triodes 1DT, 2DT, 3DT in the apparatus are also energized and the thyratrons and double triodes may conduct if the potential impressed between their respective control electrodes and their cathodes is of the proper magnitude.

In the standby condition of the apparatus, the Sequence Timer is not actuated, and the thyratron WT is nonconducting so that the network AN1 is uncharged. The thyratron HCT3 is then nonconducting, and thyratrons HCT1 and HCT2 are also nonconducting so that the firing transformer FT is quiescent. Networks B1 and B2 then maintain firing thyratrons FT1 and FT2 nonconducting so that the ignitrons I-1 and I-2 are also nonconducting, and no current flows through the primary P.

Since network AN1 is uncharged, network B3 is effective to impress a blocking potential on thyratron 1AT, and the latter is nonconducting. Since network AN1 is uncharged, thyratron 3AT is conducting, since there is no potential between its control electrode and its cathode. Network SCN is then charged and thyratron 2AT is nonconducting.

With thyratron 1AT nonconducting, transformer 1ST is quiescent and the control electrodes of one of the sections 121—123 of double triodes 2DT and 3DT are at the potentials of their cathodes so that this section of double triode 2DT conducts and this section of double triode 3DT does not conduct. Through this section 121—123 of double triode 2DT, the capacitor C is charged to an extent depending on the setting of the variable resistor VIC which is in series with the section of double triode 2DT. This produces a predetermined conduction in the associated section 121—123 of double triode 1DT. The potential drop produced across the output resistor RO1 of this section is such that the control electrode 125 of the section is at a substantial negative potential relative to the cathode 123, and the conduction of this section is low. The conduction of the other section is determined by the setting of the voltage divider VC and VC may be set so that there is initially a certain potential difference between the conductors LE1 and LE2. Since the corresponding setcion 121—123 of the double triode 3DT is connected in antiparallel with the section of the double triode 2DT, the charge on the capacitor is limited to the potential available at the adjustable tap of the variable resistor VIC.

Since transformer 1ST is quiescent the section 131—133 of double triode 2DT is maintained nonconducting by network B5. Since thyratron 2AT is nonconducting, transformer 2ST is quiescent and the remaining section 131—133 of double triode 3DT is maintained nonconducting by the blocking network B4.

Preparatory to the use of the apparatus for welding the variable components of the Slope Control Unit and the Slope Control Timing Unit are set. The resistor VPF is set to correspond to the power factor of the welder when in use; if a material such as steel which affects the power factor is to be welded this must be taken into consideration. The resistor VIC is set to yield the desired initial current during the aggregate welding pulse; the resistor VHC is set to yield the desired welding current component during the welding pulse; and the resistor VFC is set to yield the desired final current during the welding pulse. The network SCN is set to yield the desired duration of the preheat and weld components. The resistor VUS is set to yield the desired time of rise from the initial current magnitude to the welding current magnitude and the resistor VDS is set to yield the desired time of decay from the weld component magnitude to the final current magnitude. Divider VC is set so that with capacitor C uncharged the ignitrons I–1 and I–2 are fired at the latest desired instants in the positive half periods of the supply say at a phase angle of 135° after the zero instants. The charging of the capacitor C then phases the firing forward increasing the welding current.

The divider VPF determines the potential of conductor LP1 and the dividers VIC, VHC and VFC determine to what fraction of the potential the capacitor C will be charged during a weld. Resistor VHC is set to produce a higher potential than either VIC or VFC and VIC and VFC may be set for the same or for different potentials.

Operation

In describing a welding operation it will first be assumed that the switch SOO is in the On position as shown.

When a weld is to be produced with the apparatus, the work W is placed between the electrodes E1 and E2, and a starting switch which may be a foot switch connected in the Sequence Timer is actuated. The actuation of this switch causes the electrodes E1 and E2 to be properly seated on the work W and pressure to be applied between the electrodes and the work. Then, the thyratron WT becomes conducting.

This thyratron conducts during alternate half periods of the supply, charging network AN1 in such a sense as to counteract the blocking potential provided by network B3. The network AN1 is charged during alternate half periods, but it retains the charge impressed during each alternate half period for the whole period during which the charge is impressed. During this whole period then, thyratron HCT3 can conduct. When thyratron HCT3 can conduct, it permits thyratrons HCT1 and HCT2 to conduct, and each of the latter may conduct at an instant in its positive half period predetermined by the setting of the network PHN and by the potential impressed through the conductors LE1 and LE2. This potential corresponds to the initial charge on the capacitor C which in turn depends on the setting of resistor VIC.

The phases of the potentials impressed on the thyratrons WT, HCT1 and HCT2 are such that the anode cathode potential of thyratron HCT1 is positive when the anode-cathode potential of WT is positive so that thyratron HCT1 can conduct during the half period when the network AN1 is charging.

Thyratrons HCT1 and HCT3 then conduct when the potential in the control circuit of thyratron HCT1 rises to the firing magnitude and current flows through the primary FP. Potential is then impressed in the secondary FS1 to fire thyratron FT1 and ignitron I–1 is rendered conducting to supply current of one polarity to the primary P and through transformer T to the work W. During the succeeding half period network AN1 still has sufficient charge to permit HCT3 to conduct and thyratron HCT2 can conduct. HCT2 conducts at an instant predetermined by the setting of resistor VIC causing thyratron FT2 and ignitron I–2 to fire so that current of the opposite polarity is supplied to the work W. During this initial phase of the operation the firing is late in the half periods during which the anode-cathode potentials of thyratrons HCT1 and HCT2 respectively are positive. The initial phase of the operation just described depends on the setting of resistor VIC and since it determines the initial current it is called the initial current resistor. Usually the network PHN is set so that in the absence of potential in conductors LE1 and LE2, thyratrons HCT1, HCT2 and HCT3 would fire one quarter cycle or 90° after the zero point. During the initial phase of the operation conductor LE2 is usually positive relative to conductor LE1 so that the conduction of thyratrons HCT1, HCT2 and HCT3 may be later than 90° angle. After this start of the operation it now continues in a manner governed by the Slope Control Unit and the Slope Control Timer Unit.

In the Slope Control Timer Unit, thyratron 1AT conducts when thyratron WT conducts and thyratron 1AT supplies blocking control potential to the presently conducting sections 121—123 of double triodes 2DT and 3DT and the latter becomes nonconducting. In addition, potential is supplied to the network AN4 through the secondary 1SS3 to counteract the blocking bias B5, and the other section 131—133 of double triode 2DT now conducts. The current which flows through this section flows from the conductor LP1, the variable resistor VHC, the variable resistor VUS, the anode resistor 155, the anode 131 and cathode 133 of the section of double triode 2DT, the capacitor C to the conductor LN. Thus current can flow because resistor VHC is set at a higher potential than VIC. The capacitor C now charges to a potential depending on the setting of the variable resistor VHC at a rate depending on the setting of the variable resistor VUS. The variable resistor VUS has a far higher impedance than the variable resistor VHC. The potential on capacitor C is thus increased, and the corresponding conduction of the associated section of double triode 1DT is correspondingly increased from its magnitude during standby. Thus, the potential of conductor LE1 with respect to conductor LE2 gradually increases from the value corresponding to the standby setting; that is the setting of VIC, to a magnitude corresponding to the setting of variable resistor VHC.

The magnitude of the potential on conductors LE1 and LE2 determines the instants in the half periods of the supply when the thyratrons HCT1 and HCT2 are rendered conducting. At these instants ignitrons I–1 and I–2 are rendered conducting. Since at this time the charge on capacitor C and the conduction of the associated section of double triode 1DT is increasing, the ignitrons I–1 and I–2 are rendered conducting earlier and earlier in the half periods of the supply and conduct more and more current. This is the preheat phase of the welding pulse. The rate at which the charge on capacitor C rises is determined by the setting of resistor VUS, and this resistor then determines the rate at which the current flow through the primary P increases and may be called the up-slope resistor.

The rise in the current through the primary P continues for a time interval determined by the setting of the variable resistor VUS. Eventually, the capacitor C reaches a stable potential which is determined only by the setting of the variable resistor VHC. At this time, the apparatus has reached the welding phase of the welding pulse, and since the current is now determined by the setting of the resistor VHC this resistor is called the heat-control resistor because it controls the heat during the actual welding phase of the welding pulse. The magnitude to which this current may rise is limited by the variable resistor VPF which determines the potential of LP1 and this resistor being set usually to correspond to the power factor of the load being welded, is called the power-factor resistor. The overall current which flows may be set by setting the current which flows through the remaining section of the double triode 1DT, since it determines the magnitude of the difference of potential between the conductors LE1 and LE2. This potential is set by the voltage divider VC which may then be called the current setting divider.

After the welding current reaches the welding phase, it continues to flow for a time interval determined by the Slope Control Timer Unit, and to explain this operation, it is desirable that the discussion digress to the Slope Control Timer Unit. The conduction of thyratron WT in addition to rendering thyratron 1AT conducting, also renders thyratron 3AT nonconducting. This occurs because conductor LO is reduced in potential substantially to the potential of the conductor AL1 by the conduction of thyratron WT. When thyratron 3AT becomes nonconducting, the network SCN begins to time out. This timing out continues during the preheat or up-slope and weld phases of the welding pulse. Eventually, the network SCN discharges sufficiently to permit thyratron 2AT to conduct.

The conduction of the latter results in the flow of current through the primary 2SP. Potential is now induced in the secondaries 2SS1 and 2SS2. The potential impressed in the secondary 2SS1 counteracts the potential supplied by network AN4 rendering the associated section 131—133 of double triode 2DT nonconducting and stopping the charging of capacitor C. The potential induced in the secondary 2SS2 charges network AN6 to render the associated section of double triode 3DT conducting. The capacitor C now discharges in a circuit extending from the capacitor through double triode 3DT, the resistor 155 in series with the variable resistor VDS, the variable resistor VDS, and associated contact 154 of the on-off switch S, the variable resistor VFC, the negative conductor LN, to the other plate of the capacitor. The discharge of the capacitor C reduces the conduction of the associated section 121—123 of the double triode 1DT, reducing the positive potential between conductors LE1 and LE2 and causing the ignitrons I-1 and I-2 to fire at angles in the half periods of the supply which are later and later. The rate of this change is determined by the variable resistor VDS which is of considerably higher magnitude than the variable resistor VFC. The potential to which the capacitor C is finally discharged is determined by the setting of the variable resistor VFC.

The phase of the operation of the apparatus just described is the post-heat or down slope phase. Since the rate at which the current decays during this phase is determined by the variable resistor VDS, this resistor is called the down slope resistor. Since the current at the end of this phase of the operation is determined by the resistor VFC, the latter is called the final current resistor.

The post heat phase of the welding pulse continues so long as the thyratron WT conducts. Eventually, this thyratron is rendered nonconducting. When this occurs, thyratron 1AT becomes nonconducting and thyratron 3AT becomes conducting, rendering thyratron 2AT nonconducting. The originally conducting sections 121—123 of triodes 3DT and 2DT may then conduct, and the originally non-conducting sections 131—133 become nonconducting, and the apparatus is reset to the initial condition. The section 121—123 of 3DT which now conducts provides a discharge path for the capacitor C if it now happens to be at a higher potential than that corresponding to the setting of the initial current resistor VIC.

During the operation of this apparatus, the potential for shifting the firing instants of the thyratrons HCT1 and HCT2 is derived from the cathode follower circuits associated with double triode 1DT. The output impedance of these circuits match the low input impedance of the thyratrons HCT1 and HCT2 and the grid current drawn between the control electrodes 75 and the cathodes 73 of these thyratrons does not materially affect the signal delivered by the Slope Control Unit. Since the network PHN is always at a fixed setting there are no variations in the setting of the network PHN to affect the signal from the Slope Control Unit. The magnitudes of the currents during the various phases of the welding currents are set by the various voltage dividers in the Slope Control Unit. Further the output of the cathode follower circuits (1DT) is dependent upon the difference between the voltage on capacitor C and the voltage on control electrode 135 of 1DT. Both of these voltages are directly proportional to line voltage, and rigorously the cathode follower circuits are independent of line voltage variations only at the point where the two voltages are equal. As the difference between the two voltages becomes greater, the effect of line variations increases. The maximum output variation with line voltage is, however, only half as great as in the prior art apparatus since in our apparatus the firing instants of the ignitrons I-1 and I-2 is shifted to only half as great an extent. This is by virtue of the fact that network PHN is initially set and remains set so that in the absence of potential on the conductors LE1 and LE2 the thyratrons HCT1 and HCT2 are fired of the order of one-quarter period after the zero instants in the positive half periods of the supply and the firing instants are shifted about this point as the potential on LE1 and LE2 varies in contrast to the prior art control wherein the original setting is at the most forward instant desired and the phase shifting is in one sense only, taking up to twice the voltage amplitude.

With the on-off switch SOO for the Slope Control Unit in the off position, the capacitor C is maintained continuously charged through the normally conducting section of the double triode 2DT to a potential determined by the setting of the heat control resistor VHC. Thus, with the Slope Control Unit off, the thyratrons HCT1 and HCT2 are fired at instants in the periods of the supply determined by the setting of the heat control resistor VHC.

*Actual operating system*

In a system which we have found to operate satisfactorily, the Welder, Power Supply Unit, Heat Control Unit and Sequence Timer are of the usual types. The Slope Control Unit and Slope Control Timer Unit have the following components:

| | |
|---|---|
| Double triodes 1DT, 2DT and 3DT | 6SN7. |
| Thyratrons 1AT, 2AT and 3AT | WL–2050. |
| Output resistors RO1 and RO2, each | 33,000 ohms. |
| Capacitor C | .047 microfarad. |
| Resistors 143 and 145 | 1,500 ohms. |
| Voltage divider VC | 10,000 ohms. |
| Output of rectifier RX | About 124 volts. |
| Filtering capacitor 141 | 16 microfarads. |
| Secondary 2AS3—output | 115 volts. |
| Resistor 239 | 100 ohms. |
| Primary 1SP—output | 115 volts R.M.S. |
| Secondaries 1SS1 and 1SS2—output | 25 volts R.M.S. |
| Capacitors 161, 171, 181, 191, 201, 211, 221, each | .5 microfarad. |
| Resistors 163, 173, each | 22,000 ohms. |
| Resistors 181, 193, 203, each | 33,000 ohms. |
| Resistor 223 | 68,000 ohms. |
| Resistor 211 | .15 megohm. |
| Grid resistors 207, 227, 240, 261, 271, each | .1 megohm. |
| Variable resistor VPF | 10,000 ohms. |
| Resistor 149, are two resistors, each | 33,000 ohms. |
| Resistor 147 | 4,700 ohms. |
| Variable resistor VIC | 10,000 ohms. |
| Variable resistor VHC | 10,000 ohms. |
| Variable resistor VFC | 10,000 ohms. |
| Variable resistor VUS | 1 megohm. |
| Variable resistor VDS | 1 megohm. |

Resistors 155 and 157,
    each _____ .1 megohm.
Potential between AL1 and
    AL2 _____ 115 volts R.M.S.
Resistor 263 _____ 100 ohms.
Capacitor 251 _____ A parallel bank consisting of capacitors of .05, .1, .25, .5 microfarad.
Resistor 255 _____ .47 megohm.
Variable resistor 253 ____ .5 megohm.
Fixed resistor 257 _____ 4,700 ohms.
Resistor 241 _____ 100 ohms.
Voltage 2SP _____ 115 volts R.M.S.
Voltages 2SS1 and 2SS2
    each _____ 40 volts R.M.S.
Surge suppressor capacitors _____ .002 microfarad.

The magnitudes and identification in the above list cover a typical system and are not intended to limit the scope of our invention. Each of the components or groups of components may be replaced by other components known to those skilled in the art and the changes over a wide range of components and component magnitudes may thus be made.

*Conclusion*

While we have shown and described a certain embodiment of our invention, many modifications are possible. Thus while our invention is embodied in apparatus for producing a welding pulse with all three components; preheat, weld and post heat, it may be embodied in apparatus in which the welding pulse has only two of three components: preheat and weld or post heat and weld and such apparatus would necessarily be of simpler structure than that disclosed. Our invention, therefore, is not to be restricted except insofar as is necessitated by the spirit of the prior art.

We claim as our invention:

1. Heat control apparatus for welding and the like including at least one electric discharge device for determining the heat, said device having a control electrode and a plurality of principal electrodes, means for impressing between said principal electrodes an alternating potential, means for impressing between said control electrode and one of said principal electrodes a composite potential consisting of an alternating current component displaced in phase with reference to the potential impressed between said principal electrodes and a variable direct current component for setting the instants in the periods of said potential impressed between said principal electrodes when said device is rendered conducting, the said apparatus being characterized by a pair of cathode follower circuits each including an electric discharge device having an anode, a cathode, and a control electrode and each cathode-follower circuit having an output terminal connected to each said last-named cathode, by means for deriving said direct current component from said output terminals, and by control means for said cathode-follower circuits.

2. In combination a thyratron having an anode, a cathode and control electrode means; means for impressing a first alternating potential between said anode and said cathode; means for impressing between said control electrode means and said cathode a second alternating potential displaced in phase with respect to said first potential; a cathode follower combination including the following: a first conductor for deriving a positive direct-current potential, a second conductor for deriving a negative direct-current potential, a first electric discharge path having an anode, a cathode and a control electrode, a second electric discharge path having an anode, a cathode and a control electrode, a first resistor, a second resistor, means connecting said first conductor to said anodes of said paths, means including said first resistor connecting said cathode of said first path to said second conductor, and means including said second resistor connecting said cathode of said second path to said second conductor; means connecting said cathode of said first path to said control electrode means; means connecting said cathode of said second path to said cathode of said thyratron; and means connected to the control electrodes of said paths for controlling the conductivity of said paths.

3. Heat control apparatus for welding and the like including at least one electric discharge device for determining the heat, said device having a control electrode and a plurality of principal electrodes, means for impressing between said principal electrodes an alternating potential, means for impressing between said control electrode and one of said principal electrodes a composite potential consisting of an alternating current component displaced in phase with reference to the potential impressed between said principal electrodes and a variable direct current component for setting the instants in the periods of said potential impressed between said principal electrodes when said device is rendered conducting, the said apparatus being characterized by a pair of cathode-follower circuits each including an electric discharge device having an anode, a cathode, and a control electrode and each cathode-follower circuit having an output terminal connected to each said last-named cathode, by means for deriving said direct current component from said output terminals, and by control means for said cathode-follower circuits, the last said control means including means for controlling the conductivity of only one of said last-named discharge devices.

4. Heat control apparatus for welding and the like including at least one electric discharge device for determining the heat, said device having a control electrode and a plurality of principal electrodes, means for impressing between said principal electrodes an alternating potential, means for impressing between said control electrode and one of said principal electrodes a composite potential consisting of an alternating current component displaced in phase with reference to the potential impressed between said principal electrodes and a variable direct current component for setting the instants in the periods of said potential impressed between said principal electrodes when said device is rendered conducting, the said apparatus being characterized by a pair of cathode-follower circuits each including an electric discharge device having an anode, a cathode, and a control electrode and each cathode-follower circuit having an output terminal connected to each said last-named cathode, by means for deriving said direct current component from said output terminals, and by control means for said cathode-follower circuits, the last said control means including a capacitor connected to the control electrode of one of said last-named discharge devices and means for charging and discharging said capacitor in accordance with a predetermined schedule.

5. Heat control apparatus for welding and the like including at least one electric discharge device for determining the heat, said device having a control electrode and a plurality of principal electrodes, means for impressing between said principal electrodes an alternating potential, means for impressing between said control electrode and one of said principal electrodes a composite potential consisting of an alternating-current component displaced in phase with reference to the potential impressed between said principal electrodes and a variable direct-current component for setting the instants in the periods of said potential impressed between said principal electrodes when said device is rendered conducting, and means for actuating said apparatus from a quiescent condition during standby to an operating condition, the said apparatus being characterized by a pair of cathode-follower circuits each including an electric discharge device having an anode, a cathode, and a control electrode and each cathode-follower circuit having an output terminal connected to each said last-named cathode, by means for deriving said direct-current component from said output terminals, and by control means for said cathode-follower circuits, the last said control means including a capacitor connected to the control electrode of one of said last-named discharge devices and means for charging and discharging said capacitor in accordance with a predetermined schedule, the said charging and discharging means including means for maintaining the capacitor charged to a predetermined potential during the standby condition of the apparatus, means responsive to said actuating means for said apparatus for charging said capacitor to a higher potential than said predetermined potential during a first predetermined interval, for maintaining said capacitor at said higher potential during a second predetermined interval following said first interval, and for discharging said capacitor to a lower predetermined potential during a third predetermined interval.

6. Heat control apparatus for welding and the like including at least one electric discharge device for determining the heat, said device having a control electrode and a plurality of principal electrodes, means for impressing between said principal electrodes an alternating potential, means for impressing between said control electrode and one of said principal electrodes a composite potential consisting of an alternating-current component displaced in phase with reference to the potential impressed between said principal electrodes and a variable direct-current component for setting the instants in the periods of said potential impressed between said principal electrodes when said device is rendered conducting, and means for actuating said apparatus from a quiescent condition during standby to an operating condition, the said apparatus being characterized by a pair of cathode-follower circuits each including an electric discharge device having an anode, a cathode, and a control electrode and each cathode-follower circuit having an output terminal connected to each said last-named cathode, by means for deriving said direct-current component from said output terminals, and by control means for said cathode-follower circuits, the last said control means including a capacitor connected to the control electrode of one of said last-named discharge devices and means for charging and discharging said capacitor in accordance with a predetermined schedule, the said charging and discharging means including means for maintaining the capacitor charged to a predetermined potential during the standby condition of the apparatus, means responsive to said actuating means for said apparatus for charging said capacitor to a higher potential than said predetermined potential during a first predetermined interval, for maintaining said capacitor at said higher potential during a second predetermined interval following said first interval and for discharging said capacitor to a lower predetermined potential during a third predetermined interval, the said means for maintaining the capacitor charged during the standby condition of the apparatus including still another electric discharge device having an anode and a cathode, means connecting said anode and cathode to said capacitor so that during standby said capacitor maintains said anode electrically positive relative to said cathode, and means for permitting said other discharge device to conduct only during standby.

7. In combination in apparatus for welding or the like a heat-control unit including an electric discharge device having an anode, a cathode and a control electrode, and means connecting said anode and cathode in said unit so that said unit is actuated while said device is conducting, a slope control timing unit including another electric discharge device having an anode, a cathode, and a control electrode and means connecting said last-named anode and cathode in said timing unit in such manner that said timing unit is actuated while said other device is conducting, means connected to said heat control unit and to said slope control timing unit to be actuated on actuation of said timing unit and when so actuated causing said heat control unit to vary the heat developed during a welding operation in accordance with a predetermined pattern set by said causing means, and means for impressing a potential in common between the control electrodes and the cathodes of both said devices, said potentials including a biasing component for blocking both said devices and a counteracting component for permitting said devices to conduct during predetermined intervals whereby said heat control unit and said timing unit are actuated together.

8. Heat control apparatus for welding and the like including at least one electric discharge device for determining the heat, said device having a control electrode and a plurality of principal electrodes, means for impressing between said principal electrodes an alternating potential, means for impressing between said control electrode and one of said principal electrodes a composite potential consisting only of an alternating-current component displaced in phase with reference to the potential impressed between said principal electrodes and a direct-current component variable in magnitude for setting the instants in the periods of said potential impressed between said principal electrodes in accordance with the magnitude of said direct current component when said device is rendered conducting, the said apparatus being characterized by the fact that said alternating-current component is set so that with the direct-current component zero the discharge device is rendered conducting at an intermediate phase angle, in the half periods of said alternating potential when its anode is positive relative to its cathode, which phase angle is of the order of one-quarter period after the instant of zero potential, and said impressing means includes means for varying the magnitude of the direct-current component both in a positive sense and in a negative sense from zero magnitude.

9. Heat control apparatus for welding and the like including at least one electric discharge device for determining the heat, said device having a control electrode and a plurality of principal electrodes, means for impressing between said principal electrodes an alternating potential, means for impressing between said control electrode and one of said principal electrodes a composite potential consisting of an alternating-current component displaced in phase with reference to the potential impressed between said principal electrodes and a variable direct-current component for setting the instants in the periods of said potential impressed between said principal electrodes when said device is rendered conducting, the said impressing means connecting said control electrode and said cathode in a low impedance input circuit and the said composite potential at times rendering said control electrode positive relative to said cathode, the said apparatus being characterized by impressing means including a network having a low impedance output circuit connected to said input circuit for supplying said direct current component, said network including electric discharge valve means of the high vacuum type and control means connected to said valve means for varying the conductivity of said valve means continuously.

10. In combination capacitive means, means for supplying a first direct-current potential having a first magnitude, a first electric discharge device having an anode and a cathode, means connected to said capacitive means, said anode and cathode of said device and said supplying means operative when said first device is conducting for impressing said first potential across said capacitive means to charge said capacitive means to a first potential having a first polarity and limited in magnitude by said first magnitude, means for supplying a second direct-current potential having a second magnitude higher than said first magnitude, a second electric discharge device having an anode and a cathode, means connected to said capacitive means, said second potential supplying means and said anode and cathode of said second device operative when said second device is conducting, for impressing said second potential across said capacitive means to charge said capacitive means to a second potential having said first polarity and limited by said second magnitude, means connected to said first and second devices for initially rendering said first device conducting, and selectively actuable means connected to said first and second devices when actuated for rendering said first device non-conducting and second device conducting for a predetermined interval and thereafter rendering said first device conducting and said second device non-conducting.

11. In combination capacitive means, means for supplying a direct-current potential having a positive terminal and a negative terminal, a first electric discharge device having an anode and a cathode, a second electric discharge device having an anode and a cathode, means connecting in series said supplying means, said capacitive means and said anode and cathode of said first device with said anode electrically nearer said positive terminal than said cathode, means connecting in series said supplying means, said capacitive means and said anode and cathode of said second device with said cathode of said second device electrically nearer said positive terminal than said anode, and means connected to said first and second devices for maintaining both of said devices conducting.

References Cited in the file of this patent

UNITED STATES PATENTS

| | | |
|---|---|---|
| 1,985,069 | Anschutz | Dec. 18, 1934 |
| 2,179,105 | Sidney | Nov. 7, 1939 |
| 2,206,446 | Bereskin | July 2, 1940 |
| 2,289,321 | Collom | July 7, 1942 |
| 2,314,691 | Dawson et al. | Mar. 23, 1943 |
| 2,370,071 | Poole | Feb. 20, 1945 |
| 2,435,841 | Morton et al. | Feb. 10, 1948 |
| 2,452,880 | Van Beuren | Nov. 2, 1948 |
| 2,516,422 | Rockafellow | July 25, 1950 |
| 2,582,676 | Bordewieck et al. | Jan. 15, 1952 |
| 2,590,582 | Stadum et al. | Mar. 25, 1952 |
| 2,623,168 | Stadum et al. | Dec. 23, 1952 |
| 2,637,786 | Bordewieck | May 5, 1953 |
| 2,648,004 | Wheeler | Aug. 4, 1953 |
| 2,656,461 | Elliott | Oct. 20, 1953 |
| 2,721,306 | Riley et al. | Oct. 18, 1955 |
| 2,760,141 | Van Ness | Aug. 21, 1956 |
| 2,765,402 | Bivens | Oct. 2, 1956 |
| 2,781,489 | Petrides | Feb. 12, 1957 |
| 2,849,608 | Large | Aug. 26, 1958 |